United States Patent [19]

Olson

[11] Patent Number: 4,902,380
[45] Date of Patent: Feb. 20, 1990

[54] TIRE ENVELOPE EXPANDER

[76] Inventor: John C. Olson, 3315 S. Vandecar Rd., Mt. Pleasant, Mich. 48858

[21] Appl. No.: 215,744

[22] Filed: Jul. 6, 1988

[51] Int. Cl.$^4$ .............................................. B29D 30/54
[52] U.S. Cl. ..................................... 156/909; 156/96
[58] Field of Search ...................... 156/909, 96, 394.1, 156/406.2; 264/36, DIG. 74; 425/17, 20, 47; 414/426, 428, 429, 744 A

[56] References Cited

FOREIGN PATENT DOCUMENTS 2092100  8/1982  United Kingdom ............. 156/406.2

Primary Examiner—Raymond Hoch
Attorney, Agent, or Firm—Basile and Hanlon

[57] ABSTRACT

An envelope expander for mounting an annular envelope of a flexible resilient material upon a tire supported upon a tire support with the tire axis in a horizontal position includes a vertically disposed rigid gate-like frame having a central opening of a diameter exceeding that of a tire. A plurality of expander members adapted to grip the envelope at spaced locations along the edge of a circular opening in one side of the envelope are mounted on the frame for coordinated power driven movement radially of the frame opening between radially inner and outer end limits. With the expander members at their radially inner end limits, the envelope opening is slightly stretched and manually mounted on the members. The expanding members are then driven to their radially outer end limits, expending the envelope opening to a diameter greater than that of the tire. Relative movement between the frame and tire support is then utilized to move the tire through the expanded envelope opening into the interior of the envelope. The expander members are then returned to their radially inner end limits and disengaged from the envelope.

12 Claims, 4 Drawing Sheets

TIRE ENVELOPE EXPANDER

BACKGROUND OF THE INVENTION

I. Field of the Invention

The present invention relates to an apparatus for expanding and mounting or demounting an annular envelope of a flexible resilient material upon a tire.

II. Description of the Related Art

In a tire retreading operation, a layer of bonding compound is applied to the buffed tire carcass and the new tread is then applied to the carcass. The tire is then inserted into an annular envelope of flexible rubber or synthetic sheet material which encloses the outer side walls and tread of the tire. The envelope is then sealed to the opposite outer sides of the tire along the tire beads and evacuated so that atmospheric pressure will firmly press the tread against the tire compound while bonding takes place. See U.S. Pat. No. 4,624,732 to King, which discloses an apparatus for sealing such an envelope to the tire and presents a somewhat more detailed description of the function of the envelope.

The envelope in question is of a general configuration similar to that of a tire, except that it is formed of a relatively thin, flexible rubber sheet. Like the tire, the annular envelope has circular openings through its opposite sides whose diameter is approximately equal to the inner diameter of the tire on which it is to be mounted. When mounted upon the tire, the envelope is sealed to the outer side of the tire beads around these openings in the envelope. The remainder of the envelope will loosely encase the tire.

Because the tire must be inserted into the envelope through one of the circular openings in the envelope, and the diameter of that opening is substantially less than the outer diameter of the tire, the envelope opening must be expanded or stretched to accommodate the insertion or removal of the tire into or out of the envelope. While this is frequently done manually, manual mounting and demounting of the envelope is a difficult, time consuming and frequently painful task. Tires most likely to be retreaded are those subjected to heavy duty usage, such as truck tires, for example, and these larger sized tires are more difficult to manually insert or remove from the envelope.

While various machines for mounting and demounting such envelopes on tires have been on the market, they have had but limited appeal to the retreading industry. High cost and operational problems seem to be the major drawback.

One such machine presently being marketed includes a hoist from which the tire is suspended in a horizontal (tire axis vertical) position. Below the hoist is a table-like housing having a circular array of articulated fingers mounted upon the top of the housing. After a tire has been manually mounted upon the hoist, the hoist is elevated clear of the fingers which are then located in a radially innermost position. The envelope is then placed on top of the housing, the edges the uppermost central opening of the envelope are manually engaged with the fingers which are then power retracted radially outwardly to stretch the engaged envelope opening. The hoist is then operated to lower the tire downwardly through the expanded opening into the interior of the envelope. The fingers are then extended radially inwardly, and manually disengaged from the envelope. The enveloped tire may then be removed from the holder. Removal of the envelope is accomplished by reversing the foregoing procedure.

The present invention is directed to apparatus for mounting and demounting envelopes upon tires which can be produced at a cost substantially less than the machine described above and which performs the mounting and demounting operation in a more efficient manner.

SUMMARY OF THE INVENTION

In accordance with the present invention, an envelope mounter-demounter is constructed with a gate-like rigid frame which lies in a general vertical plane and is formed with a central opening extending horizontally through the frame of a diameter greater than the maximum outer diameter of a tire to be presented to the apparatus. A plurality of pneumatic cylinders are mounted upon the frame about the periphery of the opening to drive expanding members carried by the piston rods of the motors radially inwardly and outwardly toward and away from the axis of the opening in the frame. The expanding members are arcuately curved lengths of hollow tubing which are positioned within the frame to approximately conform to segments of a circle centered on the axis of the opening. A resilient cord or ring is threaded through all of the tubular members to resiliently retain them in a common vertical general plane. The cylinders typically extend radially from the opening axis, and the expanding members typically are fixedly mounted upon the piston rods of the respective cylinders. Where clearance may be a problem, however, the cylinder may be mounted in any desired relationship to the opening axis and coupled to its expanding member via an appropriate linkage. In this particular instance, the expanding member will be pivotally mounted on the linkage and the resilient cord, referred to above, will retain the expanding member in its desired relationship to the others.

The tubular expanding members may be positioned by their cylinders at a radially inner end limit of movement at which the curved expanding members roughly approximate a circle having a diameter which is but slightly greater than the relaxed diameter of one of the circular openings in the resilient envelope. With the expanding members in this position, the peripheral edge of the envelope opening can be mounted manually upon the expanding members with only a slight stretching of the envelope. Once so mounted, the pneumatic motors are actuated to pull the expanding members radially outwardly to expand the circular opening in the envelope to a diameter large enough to freely receive a tire.

In the present invention, no manual handling of the tire is required. The tire, upon which the envelope is to be mounted, is supported, during the envelope mounting operation by some component of the retreading processing apparatus. Typically, the tire in one arrangement will be supported in a vertical (axis horizontal) position upon an arbor which may be used in the tread applying step. In this case, the rigid frame which carries the expander members is mounted for pivotal movement about a vertical axis for a gate-like swinging movement in a path such that the tire supported upon the arbor will pass through the opening in the rigid frame.

In another arrangement, tires are suspended from an overhead monorail conveyor in a vertical position by a hook-like support and the rigid frame, which carries the expanding members, is mounted at a location extending across the path of movement of the tires along the monorail. The frame is so located that the tires will be conveyed through the central opening in the frame, and the frame is provided with an opening in the portion of the frame above the central opening which will accommodate passage of a conveyor suspension hook upon which the tire is supported.

Other objects and features of the invention will become apparent by reference to the following specification and the drawings.

DESCRIPTION OF THE PREFERRED EMBODIMENTS

Figure 2:
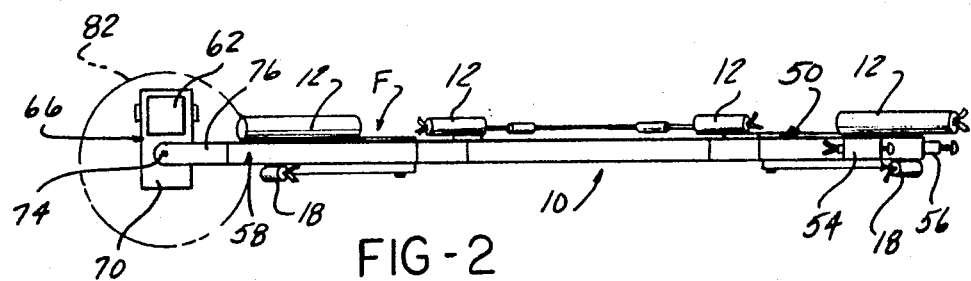
FIG. 2 is a top view of the expander of FIG. 1.
Figure 1:
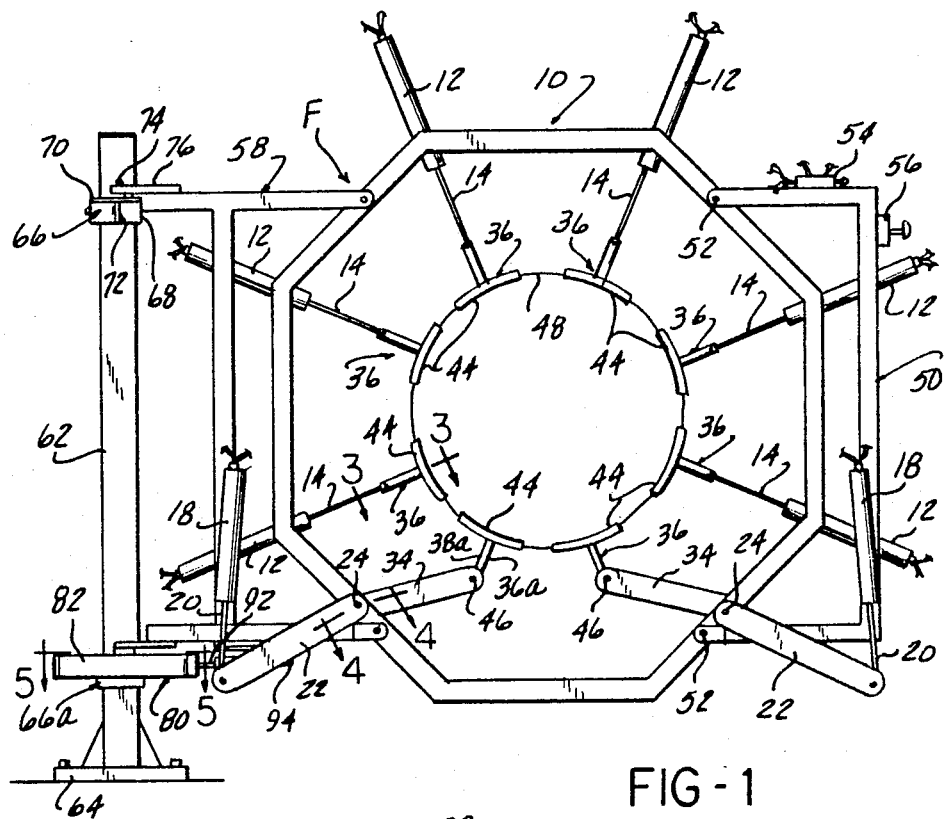
FIG. 1 is a front view of one form of envelope expander embodying the present invention, with portions of pneumatic control circuits broken away or omitted.

Referring first to FIGS. 1 and 2, an envelope expander embodying the present invention includes a rigid gate-like frame, designated generally F, which is vertically disposed to lie in a vertical general plane. As best seen in FIG. 1, a portion 10 of frame F is of an open octagonal configuration which is symmetrical about a central, horizontal axis A. The size of the central opening through octagonal frame 10 is such as to define an opening of a diameter which is larger than the outer diameter of tires upon which the envelope expander is to operate.

A plurality of fluid pressure motors in the form of pnematic cylinders 12 having reciprocal piston rods 14 are mounted at spaced locations around the periphery of octagonal frame 10 with the respective cylinders 12 and piston rods 14 located in radial alignment with the axis A of the central opening in frame 10. Each of cylinders 12 is mounted on frame 10 in fixed relationship to the frame as by suitable mounting brackets 16.

Figure 4:
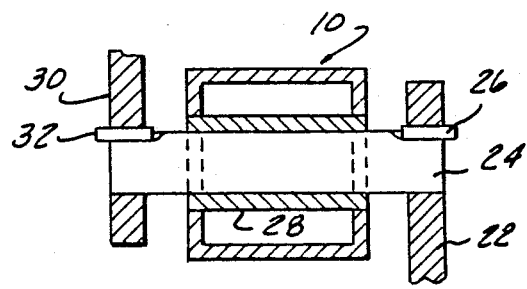
FIG. 4 is a detailed cross sectional view taken on the line 4—4 of FIG. 1.

As will be described in greater detail below, frame F is mounted for pivotal movement about a vertical axis and, in some cases, operating clearance for this movement may be restricted to the point where there is insufficient clearance for penumatic cylinders, such as cylinder 12, which project radially outwardly from the vertically hung frame. Typically, this restriction may arise from the fact that the axis A of the opening in the frame must be located at a height above the shop floor which is determined by a tire support device which the envelope expander must cooperate.

Where insufficient floor clearance is present, or components of tire builders or stands are in the way, pneumatic cylinders, such as 18, may be mounted at locations on frame F, such as those shown in FIG. 1, and have their piston rods 20 coupled to a link 22 pivotally mounted on the frame. Thus, the links 22 could be incorporated where needed to provide clearance space. As best seen in FIG. 4, a pivot pin 24 is rotatably connected to link 22 as by a key 26. Pin 24 is rotatably received within a bushing 28 mounted in a frame 10 and projects from the opposite side of the bushing to be coupled to a second link 30 as by a key 32. Essentially, the links 22 and 30 are fixedly coupled to each other via the pivot pin 24 and keys 26, 32, to function as a bellcrank in which the distal ends 34 of the links 30 will move generally radially of axis A upon reciprocation of the piston rods 20 of motors 18.

Figure 3:
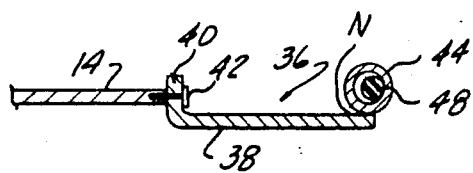
FIG. 3 is a detailed cross sectional view taken on the line 3—3 of FIG. 1.

Expanding members 36 of like construction are fixedly mounted upon the ends of each of piston rods 14. Each expanding member includes a mounting member 38 in the form of a flat plate bent upwardly at one end as at 40 to form a flange which is bolted to the end of piston rod 14 as by a bolt 42 as best shown in FIG. 3. At the opposite end of mounting member 38, a length of hollow metal tubing 44 is fixedly secured, as by welding, to mounting member 38 in a generally T-shaped relationship to the mounting member. The tube member 44, as best seen in FIG. 1, is bent so that its longitudinal axis follows an arcuate curve having a constant radius of curvature.

Generally similar expanding members, designated generally 36a, are mounted upon the distal ends of links 30a and include tubular members 44 identical to those of expanding members 36 mounted at one end of mounting members 38 which are similar to the mounting members 38 of expanding members 36, except that mounting members 38a do not have the flange 40 and are pivotally connected to the respective links 30a as by pivot pins 46. A resilient cord 48 is threaded through all of the hollow tubular members 44 and has its ends secured to each other to form a resilient ring which retains the tubular members 44 of the expanding members in the generally circular configuration best shown in FIG. 1, this circle being centered about the axis A of the opening in frame 10.

Referring now particularly to FIG. 1, frame F also includes an auxiliary frame portion, designated generally 50, is fixedly mounted upon the octagonal frame 10 as by bolts 52. Auxiliary frame 50 carries a manually actuated four-way reversing valve 54 employed to control actuation of the pneumatic cylinders 12 and 18. A second manually actuated four-way reversing valve 56 is also mounted on auxiliary frame 50 for purpose to be described in more detail below. Frame 50 may also serve as a mounting location for one of the penumatic cylinders 18.

As best seen in FIG. 1, a second auxiliary frame portion, designated generally 58, is fixedly mounted upon octagonal frame 10 at the opposite side of the frame, again as by bolts 60. Frame portion 58 is employed to mount the gate-like frame F for pivotal movement about a vertical axis relative to a fixed mounting post 62.

Mounting post 62 is fixedly mounted upon a base 64 which will be fixedly secured in position on the shop floor. Post 62 is formed from a length of square steel tubing. Upper 66 and lower 66a adjustable pivot brackets are received upon post 62 to be located at selected positions of vertical adjustment on the post. The upper bracket 66 takes the form of a square hollow tubular sleeve 68 which is slidably and adjustably received upon post 62. A mounting platform 70 is fixedly secured, as by welding, to one side of the sleeve 68 and projects horizontally outwardly from the sleeve and may be supported as by a triangular gusset 72. A vertical bore through platform 70 receives a vertically disposed pivot pin 74 which rotatably receives and supports a mounting strap 76 fixedly welded to frame 58.

Sleeve 68 may be fixedly clamped at a selected position of vertical adjustment on post 62 as by one or more clamping bolts 78 threaded through the wall of the sleeve and engaged with the side of post 62.

The lower mounting bracket 66a is of a construction similar to the upper bracket 66, described above, but functions not only to support frarme 58, but to also serve as a mounting for a portion of a brake assembly, designated generally 80.

Figure 5:
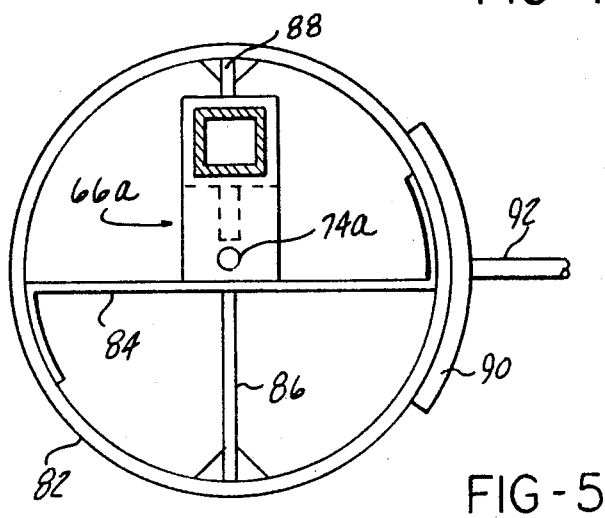
FIG. 5 is a detailed cross sectional view taken on the line 5—5 of FIG. 1.

Referring now particularly to FIGS. 1 and 5, a circular metal band 82 is fixedly mounted upon the lower pivot bracket 66a as by suitably located rigid webs, such as 84, 86 and 88 (FIG. 5), welded to bracket 66a and the inner side of band 82 to fixedly mount band 82 on bracket 66a with the axis of band 82 coaxial with the axis of pivot pin 74a on bracket 66a. The outer surface of band 82 is engaged by an arcuate brake pad 90 fixedly mounted on the end of piston rod 92 of a pneumatic cylinder 94 (FIG. 1) fixedly mounted on frame 58.

Figure 6:
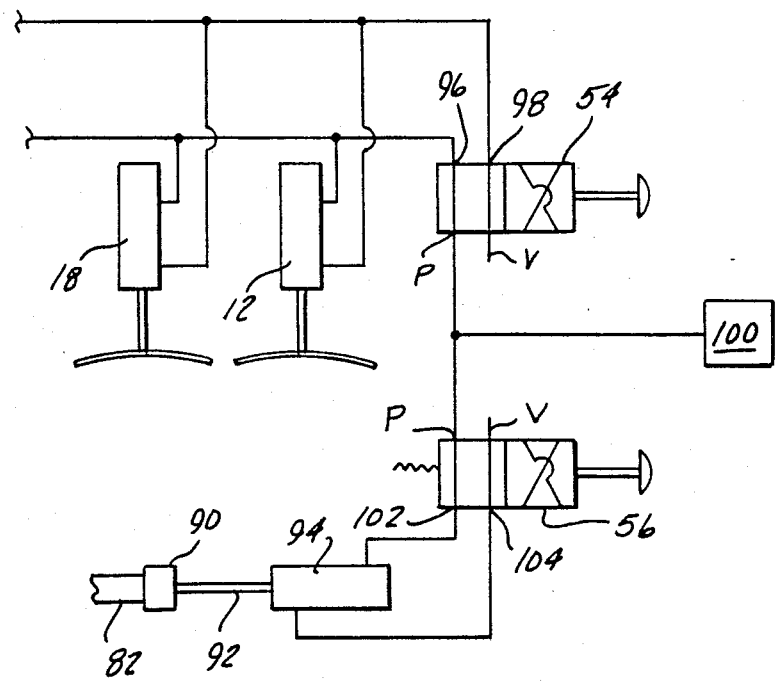
FIG. 6 is a schematic diagram of a portion of a pneumatic control circuit.
Figure 7:
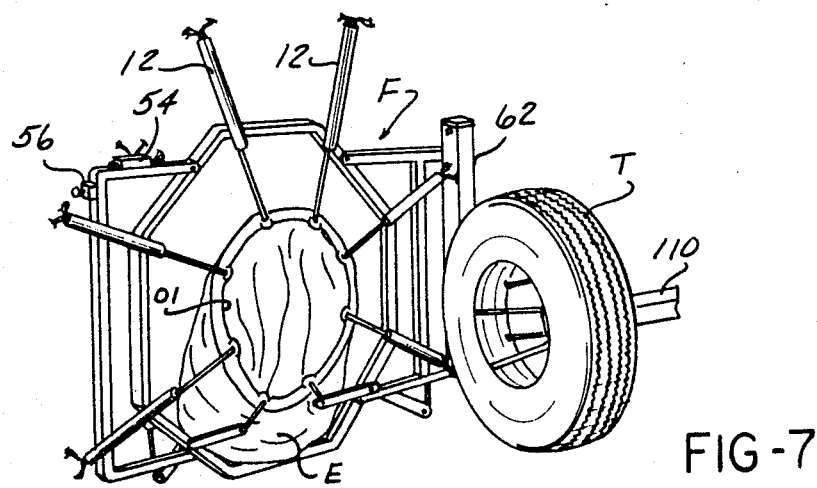
FIGS. 7, 8 and 9 are perspective views, with certain parts omitted or broken away, showing successive steps of the operation of the expander of FIG. 1.

Referring now to the schematic diagram of FIG. 6, the various expanding member actuating cylinders 12 and 18 have their rod and head ends connected in parallel to control ports 96 and 98 of the manually actuated four-way reversing valve 54. Only one cylinder 12 and one cylinder 18 are shown in FIG. 6, the remaining cylinders 12 and 18 being connected in parallel with the illustrated cylinders. Valve 54 is also provided with a pressure port P and a vent port V. Valve 54 is of a type in which the valve is manually shifted to establish either the straight through connections shown in FIG. 6 or the cross connections, and will remain in the position to which it has last been actuated until manually shifted from that position. With the straight through connections as shown in FIG. 6, air under pressure from a pressure source 100 flows through valve 54 to the head ends of the various pneumatic cylinders 18 and 12 to cause these cylinders to drive their rrespective piston rods to their fully extended positions. This movement of the piston rods is accommodated in that the rod ends of all cylinders 12 and 18 are at this time connected to the vent port V of valve 54. With the various piston rods fully extended, the expanding members 36, 36a will be at their respective radial end limits of movement inwardly relative to axis A of the frame opening. When in this position, the tubular members 44 of the various expanding members will lie roughly upon a circle of a diameter which is slightly greater than the diameter of an opening in an envelope E to be expanded by the device. See FIGS. 1 and 7.

Figure 8:
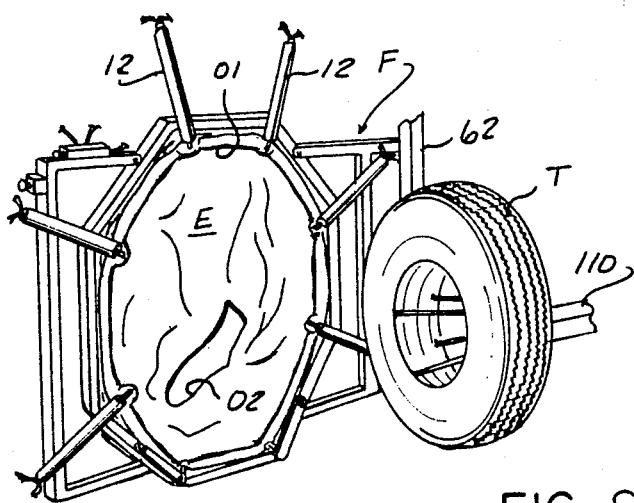
Figure 9:
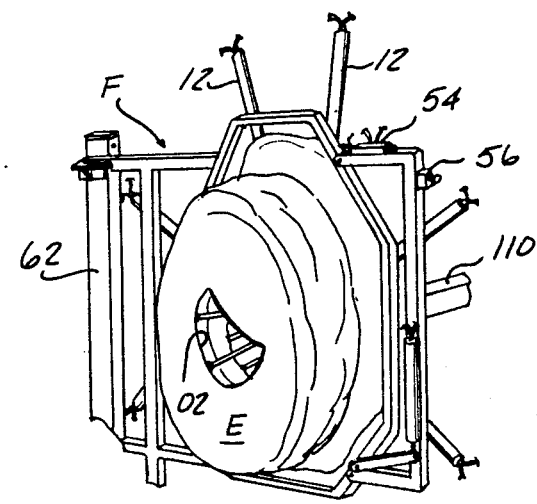

Shifting of valve 54 to establish the cross connections between the pressure port, vent port and control ports of valve 54 will connect pressure port P to control port 98 and vent port V to control port 96. This connection supplies air under pressure from pressure port P to the rod ends of cylinders 12 and 18 and vents the head ends of these cylinders to cause the piston rods of the various motors to be retracted into their cylinders. This retracting movement of the piston rods will simultaneously move all of the expanding members 36, 36a radially outwardly to an outer end limit of movement relative to axis A. When the expanding members 36, 36a are at their radially outer end limit of movement, the various tubular members 44 will lie roughly upon a circle of a diameter greater than the outer diameter of a tire T to which the envelope E is to be applied. See FIGS. 8 and 9.

Manually actuated valve 56 is a four-way reversing valve of the type in which the valve is spring biased at all times to establish one set of connections through the valve, in this case, the straight through connections. Control port 102 of valve 56 is connected to the head end of brake actuating cylinder 94, while the rod end of cylinder 94 is connected to control port 104. With valve 56 in its normal position shown, pressure is supplied to the head end of cylinder 94, while the rod end is vented, thereby applying the brake by urging brake pad 90 against the fixed circular brake band 82. Upon manual actuation of the valve, the connections to cylinder 94 are reversed to retract the piston rod 92, thereby releasing the brake. With this arrangement, the brake is released only while the valve 54 is manually held in the cross connection position.

Operation of the apparatus described above is best seen in FIGS. 7 to 9.

Post 62 is mounted in the shop floor at a location relative to a tire supporting arbor, designated generally 110, such that a tire T supported on the arbor with its axis horizontal is located within the path of pivotal movement of the central opening in octagonal frame 10 of the expander. At the commencement of an envelope mounting operation, frame F is pivoted to a position, such as that shown in FIG. 7, in which the frame is well clear of the tire T. Frame F will be held in this position by the actuated brake assembly 80. The first step of the envelope mounting operation is to manually actuate cylinders 12 and 18 to fully extend their piston rods to locate the various expander members in the radially innermost end limit of movement shown in FIG. 1.

With the expander members at their radially inner end limit of movement, the operator manually grasps the envelope E and places the peripheral edge of one opening 01 of the envelope manually over all of the tubular expander members 44. This will require at least a slight stretching of the peripheral edge of the opening, and when the opening has been passed around all of the tubular members, the peripheral edge of the opening will be held in tension within the notch N (FIG. 3) defined by the circumference of the various tubular members 54 and the flat surface of the mounting member 38 (38a) which is in tangential relationship with the outer circumference of the tubular member.

With the periphery of opening 01 so engaged with the expander members, the operator then actuates valve 54 to cause cylinders 12 and 18 to retract their piston rods, thereby drawing all of the expanding member 36, 36a radially outwardly. This expands opening 01 of the envelope, see FIG. 8. The reistance to this radial expansion of the opening diameter is evidenced in the resilient envelope primarily as a tension along the periphery of opening 01, and this tension acts to more firmly seat the edge of the opening on the respective expansion members.

When the piston rods of cylinders 12 and 18 have been fully retracted, opening 01 has now been expanded to a diameter larger than the outer diameter of the tire T.

The operator then grasps auxiliary frame 50 and manually actuates valve 54 to release the brake. The operator manually pivots frame F to swing the frame from the position shown in FIG. 8 to that shown in FIG. 9. During this movement, the tire T on arbor 110 is passed through the expanded opening 01 in the envelope and through the opening in frame 10 so that when the frame F arrives in the position shown in FIG. 9, the tire is located within the interior of envelope E.

The operator then releases valve 56 to reapply the brake and again actuates valve 54 to cause cylinders 12 and 18 to extend their piston rods, thereby returning the expanding members to their radially inner end limit of movement. The operator may now easily disengage the periphery of opening 01 of the envelope from the expanding members, retract the expanding members clear of the tire, and return the frame to the original position of FIG. 7. Demounting of an envelope from a tire is accomplished by reversing the foregoing process.

Figure 10:
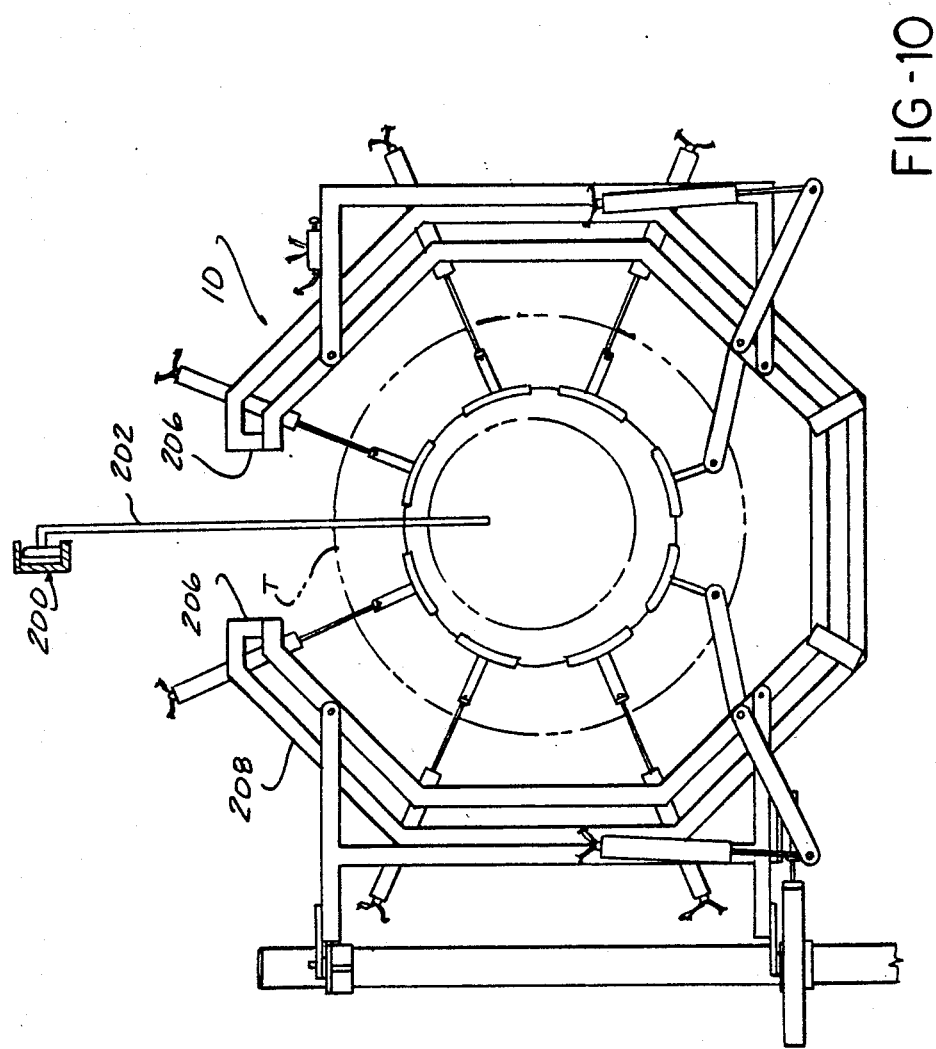
FIG. 10 is a front view, with certain parts broken away, omitted or shown in cross section of a modified embodiment of the invention.

The embodiment described above is adapted for use when the tire upon which the envelope is mounted is supported upon a stationary arbor such as 110. In some retreading operations, a conveying system, such as a monorail conveyor, may be employed to transport tires from the tread application station to a curing oven which accelerates the bonding of the tread to the carcass. With minor modifications, shown in FIG. 10, the envelope expander may be easily adapted to mount, or demount, envelopes to or from tires T which may, for example, be suspended from a monorail conveyor 200 as by a J-shaped carrier 202. In this case, the frame F is interrupted or formed with an opening in the octagonal frame 10a which will enable conveyance of the tire into or out of an expanded envelope on the expander by movement of the conveying means, rather than by the expander frame. In the case of a monorail conveyor, such a clearance opening through the frame is formed at the top of the frame as at 206. This interruption of the frame typically will require strengthening of the frame as at 208.

Where the expander is employed with a conveying system, as in FIG. 10, the frame 10a may be pivotally mounted upon a post as in the previous embodiment, so that the frame may be swung clear of the path of movement of the conveyor and tires suspended on the conveyor. Alternatively, the frame may be mounted in a fixed position on the shop floor at a selected location along the conveying path.

Operation of the expander to mount and demount the envelope will be according to the procedure previously described. Where the expander frame is mounted at a fixed location, i.e., not mounted for pivotal movement, the brake and brake actuator of the embodiment of FIG. 1 is not required.

While various embodiments of the invention have been described in detail, it will be apparent to those skilled in the art, the disclosed embodiments may be modified. Therefore, the foregoing description is to be considered exemplary rather than limiting and the true scope of the invention is that defined in the following claims.

What is claimed is:

1. An envelope expander for mounting an annular envelope of a flexible resilient material upon a tire supported upon a tire support means with the tire axis in a horizontal position, said envelope having a pair of axially aligned central openings at opposite sides of said envelope of a diameter approximately equal to the inner diameter of said tire and said envelope being adapted to enclose the outer surfaces of said tire;

said expander comprising a rigid gate-like frame lying in a general vertical plane and having an unobstructed opening therethrough generally symmetrical about a central horizontal axis normal to said general plane and of a size sufficient to accommodate the free passage of said tire therethrough with the axis of the tire generally coaxial to said central axis;

a plurality of expanding means mounted on said frame at respective locations spaced around the periphery of said central axis movable between respective extended radially inner end limits of movement at distances from said central axis approximately equal to the inner radius of said tire and respective retracted radially outer end limits of movement at distances from said central axis greater than the outer radius of said tire, said expanding means being adapted to engage said envelope at circumferentially spaced locations around the periphery of one of said central openings to expand said one of said central openings upon movement of said expanding means from said respective radially inner end limits to a size accommodating movement of said tire axially through said one of said central openings when said expanding means are at said respective radially outer end limits;

first powered means for driving said expanding means in coordinated movement between said radially inner and outer end limits, and second means operable when said one of said central openings in said envelope has been expanded by said expanding means for horizontally moving said frame and tire support means relative to each other to move a tire on said support means through the expanded one of said central openings in said envelope and said unobstructed opening in said frame into the interior of said envelope.

2. An envelope expander for mounting an annular envelope of a flexible resilient material upon a tire supported upon a tire support means with the tire axis in a horizontal position, said envelope having a pair of axially aligned central openings at opposite sides of said envevlope of a diameter approximately equal to the inner diameter of said tire and said envelope being adapted to enclose the outer surfaces of said tire;

said expander comprising a rigid gate-like frame lying in a general vertical plane and having an unobstructed opening therethrough generally symmetrical about a central horizontal axis normal to said general plane and of a size sufficient to accommodate the free passage of said tire therethrough with the axis of the tire generally coaxial to said central axis;

a plurality of expanding means mounted on said frame at respective locations spaced around the periphery of said central axis movable between respective extended radially inner end limits of movement at distances from said central axis approximately equal to the inner radius of said tire and respective retracted radially outer end limits of movement at distances from said central axis greater than the outer radius of said tire, said expanding means being adapted to engage said envelope at circumferentially spaced locations around the periphery of one of said central openings to expand said one of said central openings upon movement of said expanding means from said respective radially inner end limits to a size accommodating movement of said tire axially through said one of said central openings when said expanding means are at said respective radially outer end limits; and first powered means for driving said expanding means in coordinated movement between said radially inner and outer end limits, and second means operable when said one of said central openings in said envelope has been expanded by said expanding means for horizontally moving said frame and tire support means relative to each other to move a tire on said support means through the expanded one of said central openings in said envelope and said unobstructed opening in said frame into the interior of said envelope, wherein said tire support means supports said tire at a fixed location, and said second means comprises fixed frame means mounting said rigid frame for pivotal movement about a fixed vertical axis at a location at one side of said fixed location equidistant from the axis of a tire at said fixed location and said central horizontal axis of said unobstructed opening in said frame.

3. The invention defined in claim 2 further comprising releasable brake means engageable between said rigid frame and said fixed frame means operable to prevent pivotal movement of said rigid frame about said vertical axis.

4. The invention defined in claim 1 wherein said first powered means comprises a plurality of fluid pressure actuated motors each including a cylinder mounted on said rigid frame and a reciprocable piston rod projecting from the cylinder radially toward said central horizontal axis, and said expandinng means comprises a plurality of envelope engaging members respectively fixedly mounted upon the ends of the piston rods of said motors.

5. The invention defined in claim 4 wherein each of said envelope engaging members comprises an elongate hollow tubular member having its longitudinal axis curved at a fixed radius tire, means mounting the longitudinal midpoint of said tubular member to the associated piston rod with the curved tubular members of said plurality of expanding means disposed in a generally circular array about said central horizontal axis, and resilient ring means passing through all of said tubular members to resiliently maintain the longitudinal axes of said tubular members in a common vertical plane.

6. The invention defined in claim 1 wherein each of said expanding means comprises an elongate plate having a side surface, an elongate curved hollow tubular member fixedly secured midway between its ends to said side surface of said plate adjacent one end of said plate with said side surface in tangential relationship to the circumference of said tubular member.

7. An envelope expander for mounting an annular envelope of a flexible resilient material upon a tire supported upon a tire support means with the tire axis in a horizontal position, said envelope having a pair of axially aligned central openings at opposite sides of said envelope of a diameter approximately equal to the inner diameter of said tire and said envelope being adapted to enclose the outer surfaces of said tire;

said expander comprising a rigid gate-like frame lying in a general vertical plane and having an unobstructed opening therethrough generally symmetrical about a central horizontal axis normal to said general plane and of a size sufficient to accommodate the free passage of said tire therethrough with the axis of the tire generally coaxial to said central axis;

a plurality of expanding means mounted on said frame at respective locations spaced around the periphery of said central axis movable between respective extended radially inner end limits of movement at distances from said central axis approximately equal to the inner radius of said tire and respective retracted radially outer end limits of movement at distances from said central axis greater than the outer radius of said tire, said expanding means being adapted to engage said envelope at circumferentially spaced locations around the periphery of one of said central openings to expand said one of said central openings upon movement of said expanding means from said respective radially inner end limits to a size accommodating movement of said tire axially through said one of said central openings when said expanding means are at said respective radially outer end limits; and first powered means for driving said expanding means in coordinated movement between said radially inner and outer end limits, and second means operable when said one of said central openings in said envelope has been expanded by said expanding means for horizontally moving said frame and tire support means relative to each other to move a tire on said support means through the expanded one of said central openings in said envelope and said unobstructed opening in said frame into the interior of said envelope, wherein said tire support means comprises conveying means for conveying a tire along a fixed path with the tire axis in a horizontal position and extending generally parallel to said fixed path, means for locating said rigid frame in said fixed path with said cnetral horizontal axis of said unobstructed opening in said rigid frame in coaxial relationship with said tire axis, and means defining a clearance opening in said rigid frame accommodating the conveying of a tire by said conveying means through said unobstructed opening in said frame.

8. An envelope expander for mounting an annular envelope of a flexible resilient material on a tire, said envelope having a pair of axially aligned central apertures at opposite sides of said envelope of a diameter approximately equal to the inner diameter of a tire, and said envelope being adapted to enclose the outer surfaces of said tire, said envelope expander comprising:

a tire support for supporting a tire with a tire axis in a horizontal position;

a rigid gate-like frame lying in a general vertical plane and having an unobstructed opening therethrough generally symmetrical about a central horizontal axis normal to said general plane and of a size sufficient to accommodate the free passage of said tire therethrough with, the axis of the tire generally co-axial to said central axis;

a plurality of fluid pressure actuated motors, each fluid pressure actuated motor including a cylinder mounted on said rigid frame and a reciprocal piston rod projecting from the cylinder for coordinated movement between first and second end limits of movement;

a plurality of envelope engaging members operatively connected to ends of the piston rods of said motors and supported from said frame at respective locations spaced around the periphery of said central axis, said plurality of envelope engaging members movable between respective extended radially inner end limits of movement at a distance from said central axis approximately equal to the inner radius of said tire and respective retracted radially outer end limits of movement at a distance from said central axis greater than the outer radius of said tire, each of said envelope engaging members including an elongate hollow tubular member having its longitudinal axis curved at a fixed radius, said tubular member operatively connected to the associated piston rod at a longitudinal mid-point with the curved tubular members disposed in a generally circular array about said central horizontal axis, and resilient means passing through and interconnecting all of said tubular members to resiliently maintain the longitudinal axis of said tubular members in a common vertical plane, said envelope engaging members adapted to engage said envelope at circumferentially spaced locations around the periphery of one of said central apertures to expand said one of said central apertures upon movement of said reciprocal piston rods from said respective first end limit to a size accommodating movement of said tire axially through said one of said central apertures when said reciprocal piston rods are at said second end limit; and means for moving said frame and tire support relative to each other in a horizontal plane, said moving means operable when said one of said central apertures in said envelope has been expanded by said reciprocal piston rods, said moving means adapted to move a tire carried on said support means through the expanded one of said central apertures in said envelope, and through said unobstructed opening in said frame, into the interior of said envelope.

9. The envelope expander of claim 8, wherein said moving means further comprises a fixed frame mounting said rigid frame for pivotal movement about a first vertical axis at a location equidistant from the axis of a tire on said tire support and from said central horizontal axis of said unobstructed opening in said rigid frame.

10. The envelope expander of claim 9, further comprising releasable brake means engageable between said rigid frame and said fixed frame operable to prevent pivotal movement of said rigid frame about said vertical axis.

11. The envelope expander of claim 8, wherein said tire support includes conveying means for conveying a tire along a fixed path with the tire axis in the horizontal position and extending generally parallel to said fixed path, means for locating said rigid frame in said fixed path with said central horizontal axis of said unobstructed opening in said rigid frame in co-axial relationship with said tire axis, and means defining a clearance opening in said rigid frame accommodating the conveying of a tire by said conveying means through said unobstructed opening in said frame.

12. An envelope expander for mounting an annular envelope of a flexible resilient material on a tire, said envelope having a pair of axially aligned central apertures at opposite sides of said envelope of a diameter approximately equal to the inner diameter of said tire and said envelope being adapted to enclose the outer surfaces of said tire, said envelope expander comprising:

a tire support for supporting a tire at a fixed location with a tire axis in a horizontal position;

a rigid gate-like frame lying in a general vertical plane and having an unobstructed opening therethrough generally symmetrical about a central horizontal axis normal to said general plane and of a size sufficient to accommodate the free passage of said tire therethrough with the axis of the tire generally co-axial to said central axis;

a plurality of fluid pressure actuated motors, each fluid pressure actuated motor including a cylinder mounted on said rigid frame and a reciprocal piston rod projecting from the cylinder for coordinated movement between first and second end limits of movement;

a plurality of envelope engaging members operatively connected to the ends of the piston rods of said motors and supported from said frame at respective locations spaced around the periphery of said central axis, said plurality of envelope engaging members moveable between respective extended radially inner end limits of movement at a distance from said central axis approximately equal to the inner radius of said tire and respective retracted radially outer end limits of movement at a distant from said central axis greater than the outer radius of said tire, each of said envelope engaging members including an elongate hollow tubular member having its longitudinal axis curved at a fixed radius, said tubular member operatively connected to the associated piston rod at a longitudinal mid-point with the curved tubular members disposed in a generally circular array about said central horizontal axis, and resilient cord means passing through all of said tubular members to resiliently maintain the longitudinal axis of said tubular members in a common vertical plane, said envelope engaging members adapted to engage said envelope at circumferentially spaced locations around the periphery of one of said central apertures to expand said one of said central apertures upon movement of said reciprocal piston rods from said first end limit of movement to a size accommodating movement of said tire axially through said one of said central apertures when said reciprocal piston rods are at said second end limit of movement;

a fixed frame pivotally supporting said rigid frame for movement about a fixed vertical axis at a location to one side of said fixed location equidistant from the axis of a tire at said fixed location and said central horizontal axis of said unobstructed opening in said frame, said fixed frame operable when said one of said central apertures in said envelope has been expanded by said envelope engaging members for horizontally moving said frame and tire support relative to each other to move a tire on said support through the expanded one of said central apertures in said envelope and said unobstructed opening in said frame into the interior of said envelope; and releasable brake means engageable between said rigid frame and said fixed frame operable to prevent pivotal movement of said rigid frame about said vertical axis.

* * * * *